(12) United States Patent
Aqeel

(10) Patent No.: US 7,780,220 B2
(45) Date of Patent: Aug. 24, 2010

(54) SHADE PROVIDING APPARATUS FOR VEHICLE

(76) Inventor: Zafar Aqeel, House No. 135, Sector 'U', DHA, Lahore (PK) 54792

( * ) Notice: Subject to any disclaimer, the term of this patent is extended or adjusted under 35 U.S.C. 154(b) by 596 days.

(21) Appl. No.: 11/748,016

(22) Filed: May 14, 2007

(65) Prior Publication Data

US 2008/0284201 A1 Nov. 20, 2008

(51) Int. Cl.
  *B60J 1/20* (2006.01)
(52) U.S. Cl. .................................. 296/136.01
(58) Field of Classification Search ........... 296/136.01, 296/99.1, 95.1, 152, 163; 135/88.07, 88.1, 135/88.14; 160/22, 370.21, DIG. 4
  See application file for complete search history.

(56) References Cited

U.S. PATENT DOCUMENTS

| | | | |
|---|---|---|---|
| 3,292,971 A * | 12/1966 | Zucker ..................... 296/99.1 |
| 3,349,784 A | 10/1967 | Roberts |
| 3,876,245 A | 4/1975 | Lowery |
| 3,957,301 A * | 5/1976 | Huber ..................... 296/95.1 |
| 4,848,827 A | 7/1989 | Ou |
| 5,000,055 A * | 3/1991 | Kim ......................... 74/89.17 |
| 5,004,290 A | 4/1991 | Kim |
| 5,230,545 A | 7/1993 | Huang et al. |
| 5,443,300 A * | 8/1995 | Mohammed .............. 296/97.4 |
| 5,529,368 A | 6/1996 | Cui et al. |
| 5,690,376 A | 11/1997 | Leidal |
| 5,816,310 A | 10/1998 | Wu |
| 6,168,225 B1 * | 1/2001 | Deng et al. ............. 296/136.04 |
| 6,206,451 B1 | 3/2001 | Maano |
| 6,276,742 B1 * | 8/2001 | Deng et al. ................ 296/95.1 |
| 6,328,369 B1 | 12/2001 | Nagai |
| 6,341,811 B1 * | 1/2002 | Schoelkopf ................. 296/154 |
| 6,425,623 B2 * | 7/2002 | Nakayama ................. 296/95.1 |
| 6,782,904 B2 | 8/2004 | Tien |
| 6,783,174 B2 * | 8/2004 | Bohm et al. ................. 296/223 |
| 6,997,497 B2 * | 2/2006 | Sagi et al. ................... 296/37.7 |
| 7,156,444 B1 * | 1/2007 | Da Silva .................... 296/95.1 |
| 7,172,233 B2 * | 2/2007 | Walker ....................... 296/95.1 |
| 2003/0051748 A1 | 3/2003 | Wu |
| 2003/0141739 A1 | 7/2003 | Dong et al. |

* cited by examiner

*Primary Examiner*—H Gutman
(74) *Attorney, Agent, or Firm*—Young Basile Hanlon & MacFarlane, PC

(57) ABSTRACT

A sunshade apparatus for use with an automobile having a roof includes a plurality of panels, the panels, in use, having respective retracted positions wherein they are disposed on top of one another in stacked relation on or in the roof, and each being movable from its retracted position to an extended position projecting beyond the roof. The panels are substantially coextensive with one another when viewed in overhead plan in their respective retracted positions. In their extended positions, the panels define a substantially contiguous sunshade extending beyond the roof both lengthwise and sideways with respect to the automobile. The apparatus also comprises a panel guide mechanism for constraining each panel for movement along a respective substantially linear path between its extended and retracted positions. One version of the apparatus can shade both the roof and the windows of a vehicle.

19 Claims, 14 Drawing Sheets

SHADE PROVIDING APPARATUS FOR VEHICLE

FIELD OF THE INVENTION

The present invention relates to the field of automotive sunshades.

BACKGROUND OF THE DISCLOSURE

It is widely appreciated that exposing an automobile to sunlight can lead to elevated temperatures in the passenger compartment. In the period following start-up, this can result in substantial passenger discomfort until cabin temperature is returned to the comfort zone. As well, it is not unknown in warm climates for plastic panels and dashboards of parked vehicles to melt or distort due to sun-related heating. This phenomenon, of course, can be avoided by parking vehicles in shaded areas. However, shaded parking venues are not always readily available. For this reason, the prior art is replete with examples of automotive sunshades, as described, for example, in U.S. Pat. No. 5,004,290 (Kim), issued Apr. 2, 1991 and in U.S. Pat. No. 4,848,827 (Ou), issued Jul. 18, 1989. However, known sunshades suffer from undesirable bulk, cost and/or mechanical complexity relative to the amount of shade provided.

SUMMARY OF THE DISCLOSURE

According to one aspect of the present disclosure, a sun shade apparatus for use with a vehicle having a roof and windows including front and side windows, includes a sunshade housing adapted for mounting in or on the roof and having a top, a bottom and a horizontally extending perimeter when the apparatus is installed in or on the roof. Four panels are mounted to and supported by the housing with each panel being movable between a respective retracted position, where the panels are disposed on top of one another in stacked relation, and a respective extended position where each panel extends outwardly from a side of the housing and where the four panels together form a substantially continuous shade surface extending about the perimeter of the housing and are capable for providing shade for the windows of the vehicle including the front and side windows. A panel guide mechanism for each of the panels is connected to its respective panel and the housing. This guide mechanism constrains its respective panel for movement along a substantially linear path between the panel's extended and retracted positions. The aforementioned shade surface includes corner shade areas located at and extending outwardly both longitudinally and transversely from corners of the roof during use of the sunshade apparatus.

In an exemplary embodiment of this apparatus, when the panels are in the retracted position, they are disposed within the housing between the top and bottom of the housing.

According to another aspect of the disclosure, there is provided a combination of a vehicle roof and a sunshade apparatus for shading a passenger compartment including windows of the vehicle from the sun. The combination includes a vehicle roof having a recess formed therein, this recess having an open top and a sunshade housing adapted for mounting in the recess. There is also an elevation mechanism for moving the housing between a lower position in the recess and an elevated position wherein at least a major portion of the housing is above the surrounding region of the roof. At least one panel is mounted to and supported by the housing with the or each panel being slidable between a respective refracted position where the panel is disposed substantially in said housing and a respective extended position where the panel extends outwardly from a side of the housing so as to be capable of shading one or more of the windows during use of the sunshade apparatus. A panel guide mechanism for the or each panel is connected to the panel and the housing, this guide mechanism constraining its panel for movement along a substantially linear path between its extended and retracted positions.

In an exemplary embodiment of this combination, there are four of the panels mounted to and supported by the housing, each panel is substantially rectangular and, in their retracted positions, the panels are arranged in the housing one above another in stacked relationship and are separated from one another.

According to a further aspect of the present disclosure, a sun shade apparatus for use with a vehicle having a roof and windows including front and side windows, includes a sunshade housing adapted for mounting in or on the roof and having a top, a bottom, a front end adapted to face a front end of the vehicle, a rear end adapted to face a rear of the vehicle, and two opposite sides extending between the front and rear ends. A longitudinal centreline extends between the front and rear ends of the housing. Four substantially rectangular panels are mounted in and supported by the housing with each panel being movable between a respective retracted position, where the panels are disposed one above another in the housing, and a respective extended position where two of the panels extend outwardly from the front end of the housing and also outwardly and respectively from the opposite sides and the remaining two panels project outwardly from the rear end of the housing and also outwardly and respectively from the opposite sides of the housing. A panel guide mechanism for each of the panels is connected to its respective panel and the housing. This guide mechanism constraints its respective panel for movement along a substantially linear path extending at an acute angle to the centreline and between the panel's extended and retracted positions.

In exemplary embodiments, the sunshade apparatuses have panels which overlie one another in substantially coextensive relation when in their retracted positions and they provide a combination of relative high shade coverage with relatively few moving parts, with advantageous impacts on bulk, cost and mechanical complexity. Other advantages, features and characteristics of the exemplary embodiments, as well as methods of operation and functions of the related elements of the structure, and the combination of parts and economies of manufacture, will become more apparent upon consideration of the following detailed description with reference to the accompanying drawings, the latter being briefly described hereinbelow.

DETAILED DESCRIPTION

Figure 1:
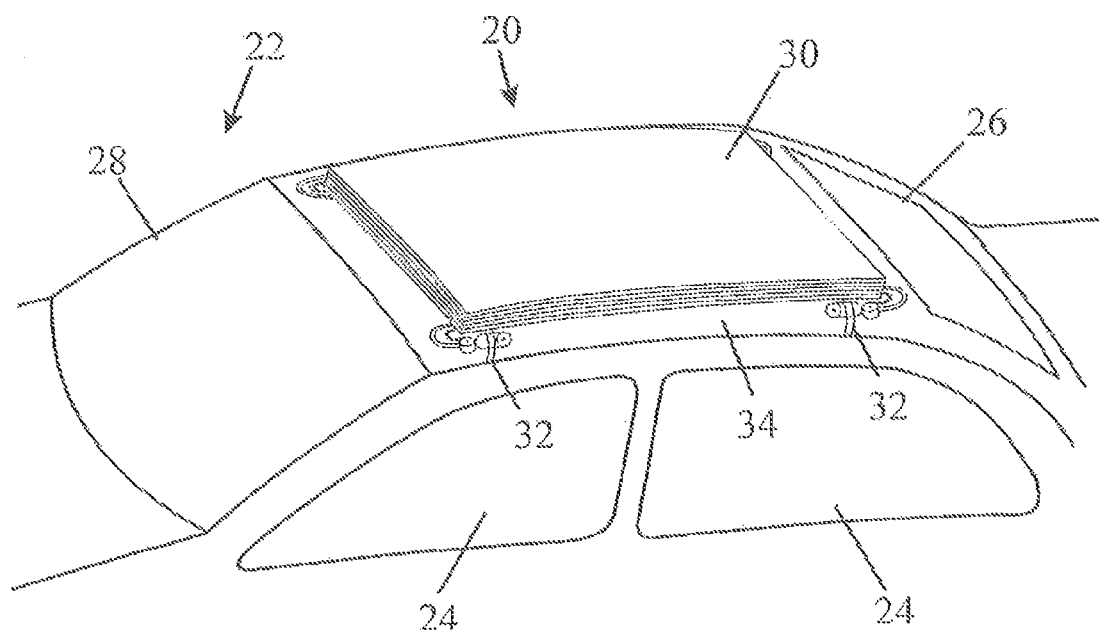
FIG. 1 is a left side, front, top partial perspective view of a sunshade apparatus constructed according to a first preferred embodiment in use with a vehicle, wherein panels (not visible in this illustration) of the apparatus are in respective retracted positions.

With general reference to FIG. 1, a first preferred embodiment of the present disclosure is a sunshade apparatus designated generally by reference 20. This apparatus is illustrated in use with an automobile 22 of the type having windows including side windows 24, a rear window 26 and a front window 28, the front window 28 forming a windshield. Except as described herein, the automobile 22 and its roof can be of standard construction. Embodiments of the present sunshade apparatus can also be made for use on such vehicles as trucks, including pick-up trucks, tractors, etc.

Figure 2:
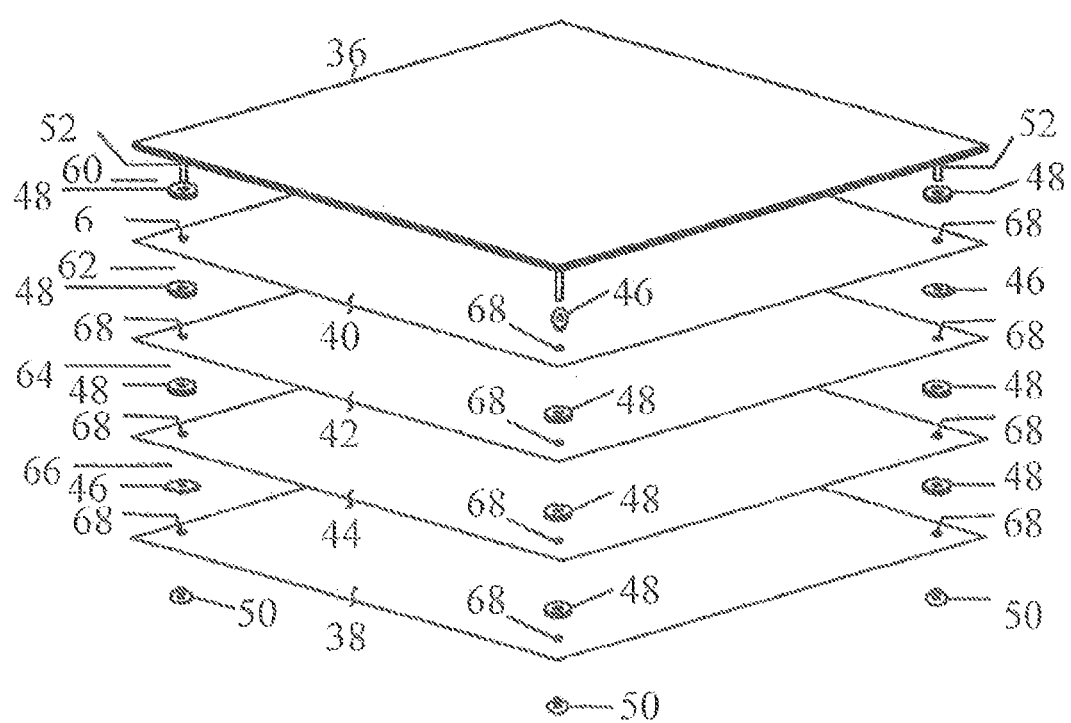
FIG. 2 is a left side, front, top exploded perspective view of a housing of the structure of FIG. 1.
Figure 3:
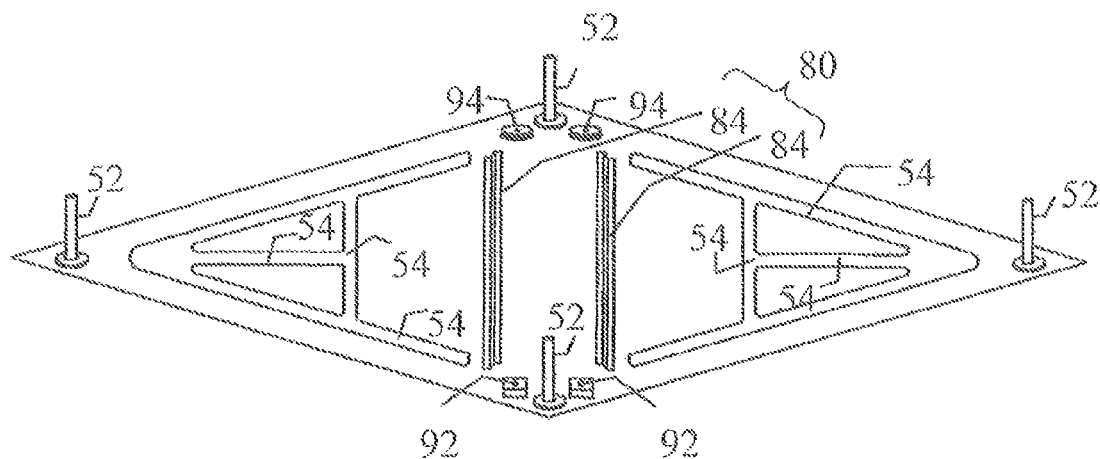
FIG. 3 is a perspective underside view of a top plate portion of the structure of FIG. 2.
Figure 4:
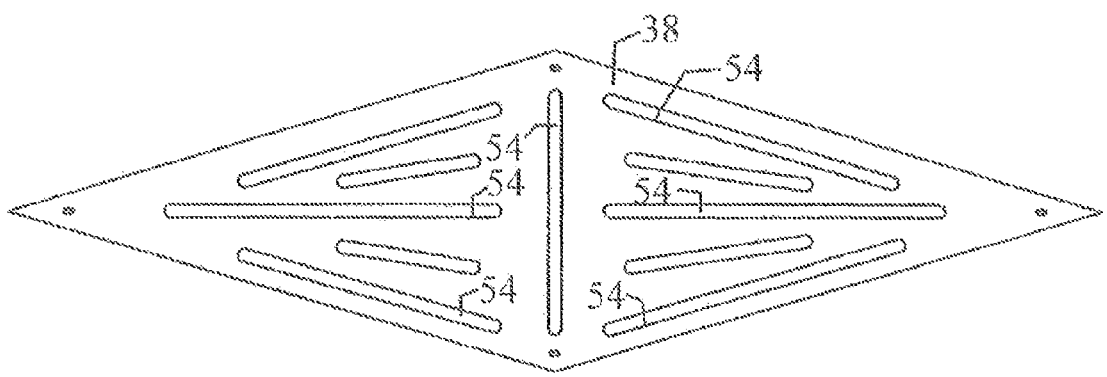
FIG. 4 is a perspective top view of a bottom plate portion of the structure of FIG. 2.
Figure 5:
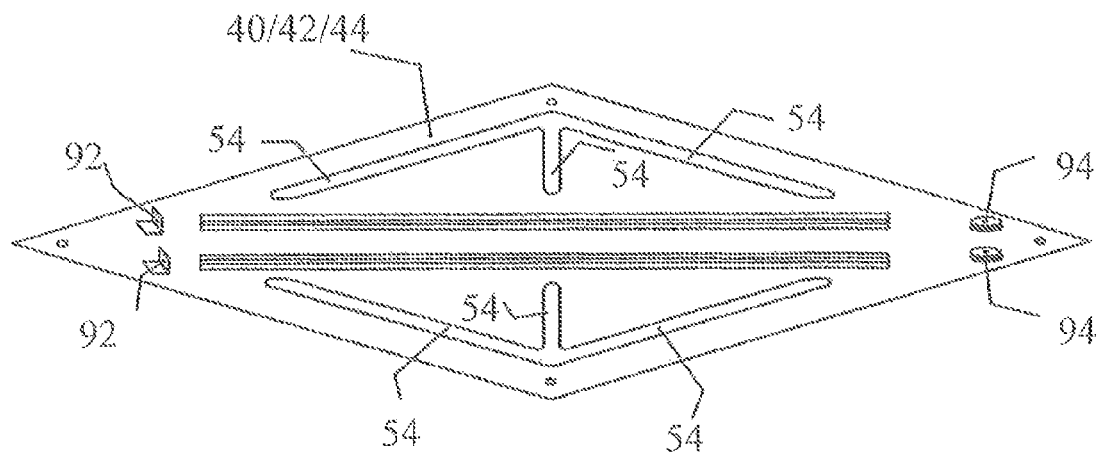
FIG. 5 is a perspective underside view of an intermediate plate portion of the structure of FIG. 2.

This preferred sunshade apparatus 20 comprises, inter alia, a housing 30 shown in exploded view in FIG. 2. With reference to FIGS. 1 and 2, this housing 30 is generally rectangular when viewed in overhead plan, is secured by straps 32 to the roof 34 of said vehicle 22 in the manner of a roof rack and comprises a top plate 36, a bottom plate 38, three intermediate plates 40,42,44, spacers 46,48 and bolts 50. Top plate 36 is a steel rectangle from which internally-threaded holding sleeves 52 extend downwardly at the corners. U-section strengthening strips 54 are spot welded to the underside of the top plate 36 for rigidity, as shown in FIG. 3. The bottom plate 38 is illustrated in FIG. 4 and is seen to also be a steel rectangle. U-section strengthening strips 54 are also spot welded to this plate 38 for rigidity. The intermediate plates 40,42,44 are substantially identical to one another and one panel is illustrated in exemplary fashion in FIG. 5. Each panel takes the form of a steel rectangle, provided with ribs or strips 54 for strength. The panels 40 to 44 are disposed in stacked relation between the top 36 and bottom 38 plates. Interleaved between the plates 36,40,42,44,38 are groups of four spacers 46,48,48,48, said four spacers 46,48,48,48 being disposed one at each corner of the housing 30, to space the plates 36,40,42,44,38 apart from one another and define rectangular slots 60,62,64,66, the latter indicated generally in FIG. 2. Bolts 50 are each threaded into a respective holding rod 52, which passes through corresponding passages or holes 68 formed in the bottom plate 38 and intermediate plates 40,42, 44 and in the spacers 46,48 to hold the housing 30 together.

Figure 6:
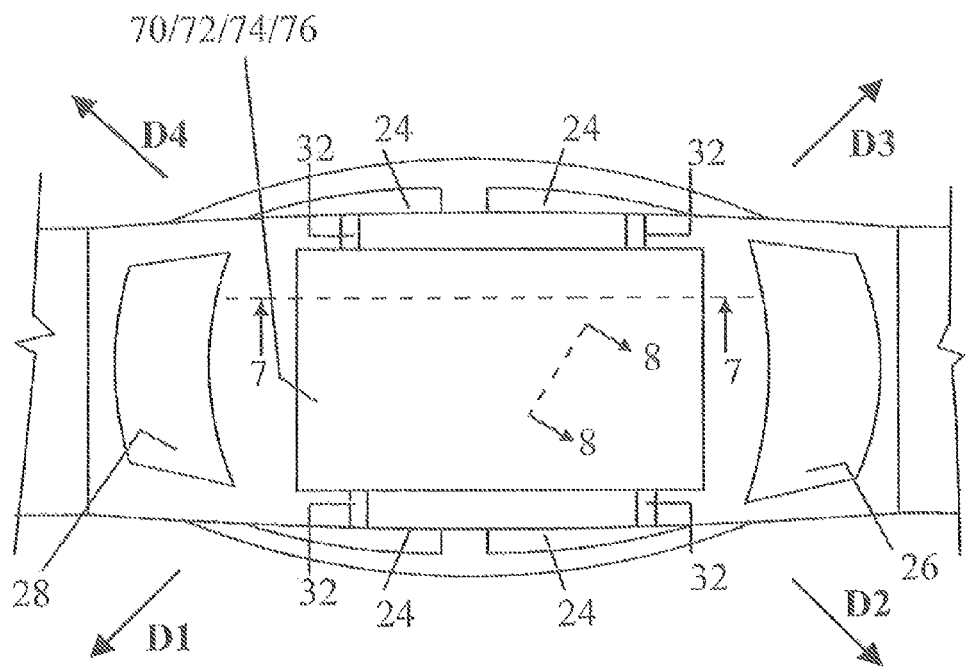
FIG. 6 is a top plan view of the structure of FIG. 1, with a top panel thereof shown in phantom outline.
Figure 7:
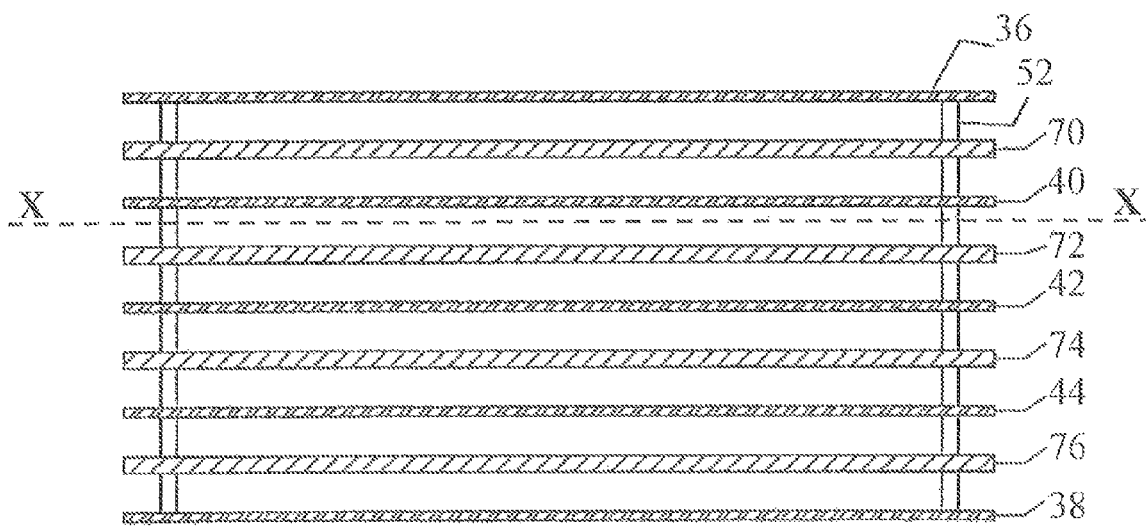
FIG. 7 is a partial view along section 7-7 of FIG. 6.
Figure 9:
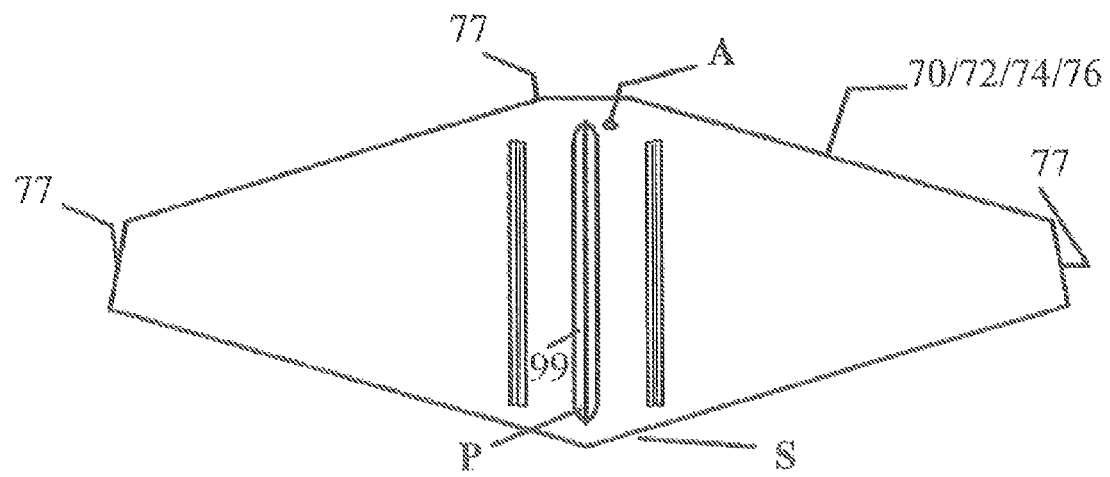
FIG. 9 is a top perspective view of an exemplary panel of the structure of FIG. 1.
Figure 10:
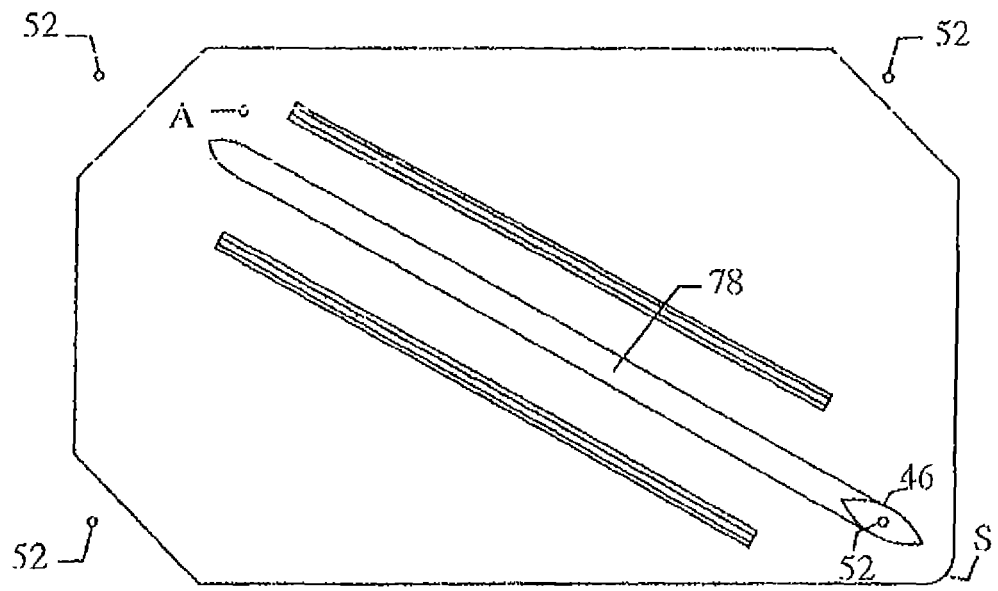
FIG. 10 is a plan view of the panel of FIG. 9 showing the position of the holding rods 52 when this panel is in the retracted state.

As indicated in FIGS. 6 and 7, this preferred sunshade apparatus 20 also comprises panels 70, 72, 74, 76. In FIG. 6, the panels 70, 72, 74, 76 (not identified in FIG. 1) are in respective retracted positions wherein they are disposed one within each slot 60, 62, 64, 66 (FIGS. 2 and 7), so as to be disposed on top of and in stacked relation to one another on said roof 34. The panels 70, 72, 74, 76 are constructed out of a flexible, resilient material, namely, 1-1.5 mm. thick fiberglass and as indicated in FIGS. 9 and 10, are substantially rectangular (except for three truncated corners as explained below) and coextensive with one another and the housing 30 when viewed in overhead plan and in their respective retracted positions. The panels 70, 72, 74, 76 are substantially identical to one another and one is illustrated in FIGS. 9 and 10. Three corners of each panel are truncated at 77, and a channel 78 extends from a point P adjacent the squared corner S, diagonally across each panel. As indicated in FIG. 10 which is a plan view of the panel, each panel is associated with a respective spacer 46 on one of the holding rods 52, with the squared off corner S of each panel being positioned such that the associated holding rod 52 extends therethrough via spacer 46 the channel 78. The truncated corners of each panel are clear of rods 52 so that each panel can move freely along the slot 78 on its guide rails. The spacers 46 are positioned one in each of the four corners of the slots 60, 62, 64, 66 which are occupied by the squared corners S of the panels 70, 72, 74, 76. The spacers 46 are shaped and dimensioned to fit and are fitted within the elongate channels 78. In this embodiment, the spacers 46 assume a generally oval shape or convex lens shape, in contrast to the generally round shape of the remaining spacers 48. A longitudinally-slit deformable rubber gasket 99 (see FIG. 9) extends over the channel 78.

Figure 8:
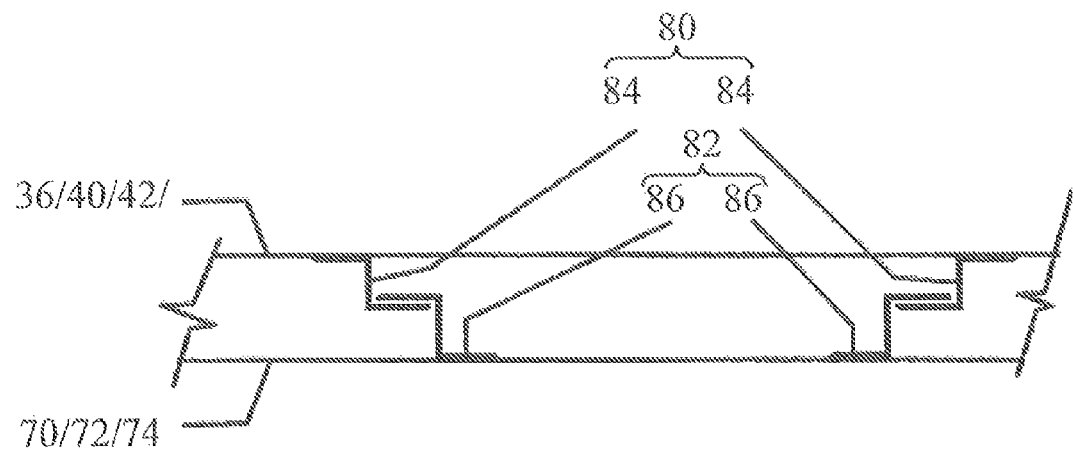
FIG. 8 is a partial view along section 8-8 of FIG. 6.

Also provided for each panel is an elongate guide rail arrangement 80 and a slide mechanism 82, as illustrated in exemplary fashion in FIG. 8. Each guide rail arrangement 80 is defined by a pair of Z-section metal rails 84 orientated in spaced relation to one another, about 12-14" apart, and parallel to the channel 78 of the panel for which said guide rail arrangement 80 is provided. The metal rails 84 are secured by spot welding to the respective plate 36,40,42,44 in the housing 30 and are located above and adjacent to the respective panel 70,72,74,76 for which the guide rail arrangement 80 is provided. The rails 84 extend diagonally across their plates. Thus, the guide rail arrangements 80 are disposed in spaced, stacked, relation to one another, parallel to plane X-X shown in FIG. 7.

The slide mechanism 82 for each panel takes the form of a pair of Z-section rails 86 interfitting one each with the Z-section rails 84 provided for each panel to permit guided translational movement of slide mechanism 82 along rail arrangement 80.

Figure 11:
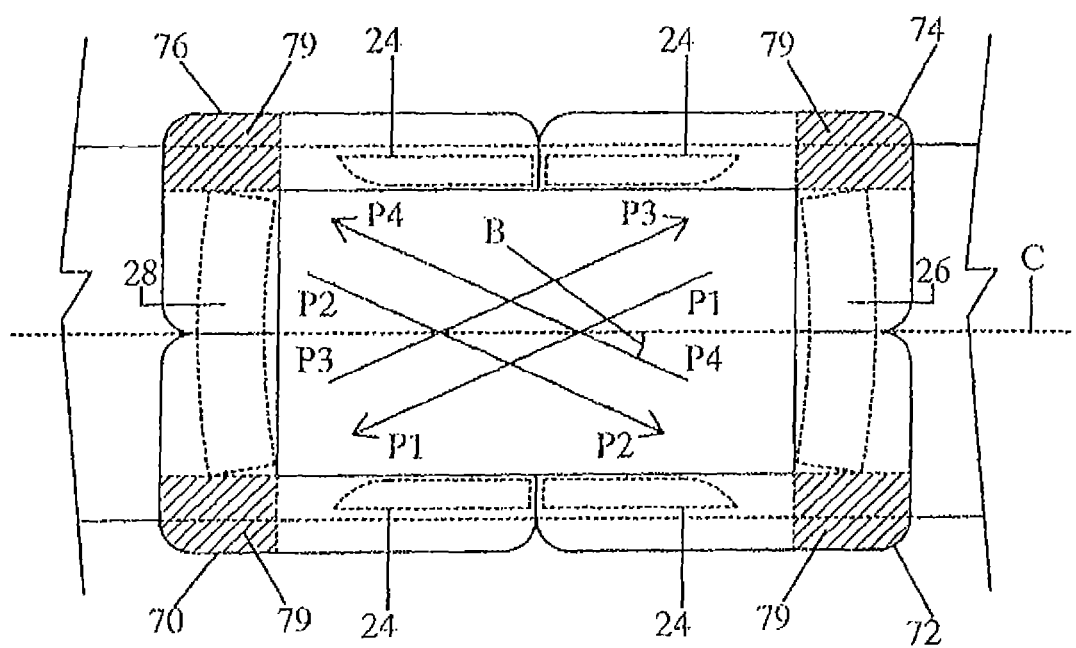
FIG. 11 is a view similar to FIG. 6, with the panels disposed at their respective extended positions.

Each panel 70, 72, 74, 76 is secured, by industrial adhesive or the like, to the slide mechanism 82 which permits sliding movement of the panel 70, 72, 74, 76 relative to the housing 30 along a respective substantially linear path P1-P1, P2-P2, P3-P3, P4-P4 indicated by the arrows in FIG. 11 from a retracted position to a respective extended position as shown in FIG. 11. The housing 30 has a longitudinal centerline indicated at C that extends between the front and rear ends of the housing. The guide arrangements 80 and slide mechanisms 82 collectively define a panel guide system or mechanism for constraining/guiding each panel for movement along a respective substantially linear path between its extended and retracted positions. This path extends at an acute angle B to the centerline C. During this movement from the retracted positions to the extended positions, the spacers 46 each traverse the elongate channel 78 in which the spacer is fitted from one end to the other (more specifically, traverses the slit in the rubber gasket 99), at which point, further panel movement is arrested. The orientation of the channels 78 and the position of the spacers 46 is such that the paths P1-P1, P2-P2, P3-P3, P4-P4 of the panels 70, 72, 74, 76 define respective directions D1, D2, D3, D4 shown in FIG. 6 which relate to one another substantially in the manner in which the geographic cardinal directions relate to one another, i.e. 90° apart.

Figure 12:
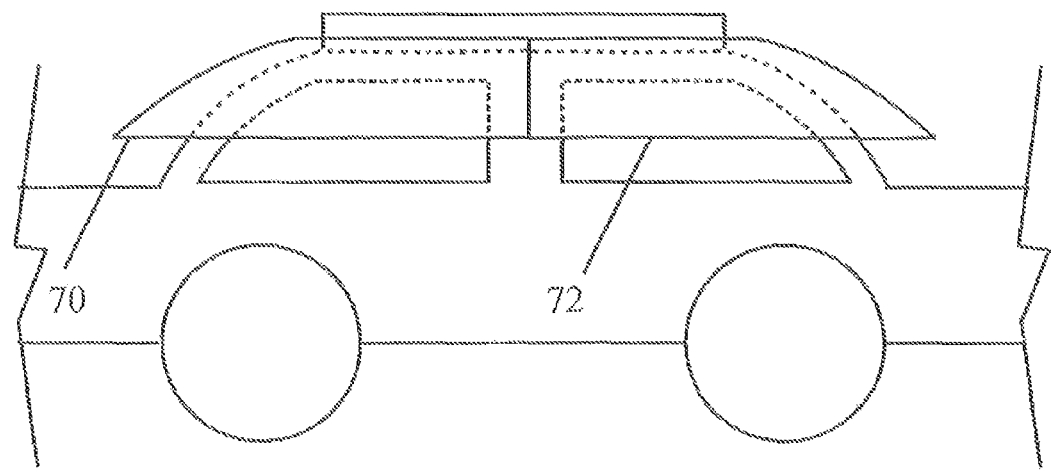
FIG. 12 is a side elevational view of the structure of FIG. 11.

In use, the orientation of the housing 30 with respect to the vehicle is such that the panels 70, 72, 74, 76 extend, respectively: towards the front and to the left of the vehicle [D1], towards the rear and to the left of the vehicle [D2]; towards the rear and to the right of the vehicle [D3]; and towards the front and to the right of the vehicle [D4]. In their respective extended positions, as shown in FIG. 11, the panels 70, 72, 74, 76 together with the housing 30 form a substantially contiguous sunshade substantially shading the roof and the windows 24, 26, 28 from midday sun when in use on a vehicle 22 disposed in the sunshine on a horizontal surface. The panels can droop slightly when fully extended, as shown in FIG. 12, which assists in shielding when the sun is lower in the sky. The shade surface provided by this exemplary embodiment includes corner shade areas 79 (indicated by cross-hatching in FIG. 11) that are located at and extend outwardly both longitudinally and transversely from corners of the roof during use of the apparatus. It will be appreciated that the exemplary combination of the housing 30 and its movable panels 70 to 76 is able to shade both the roof and the windows of the vehicle and thus the passenger compartment itself is effectively shaded. It is of course advantageous to shade not only the windows but also the roof of the vehicle. Because the roof is commonly made of metal and may in many cases be painted a dark color, the roof area can be a major source of heating up of the passenger compartment in a vehicle not equipped with the present sunshade. In addition, by providing an air gap, for example, between six and eight inches, between the housing 30 and the top of the roof, this air gap serves to insulate the roof against heating up by the sun, helping to keep the passenger compartment cooler.

Figure 13:
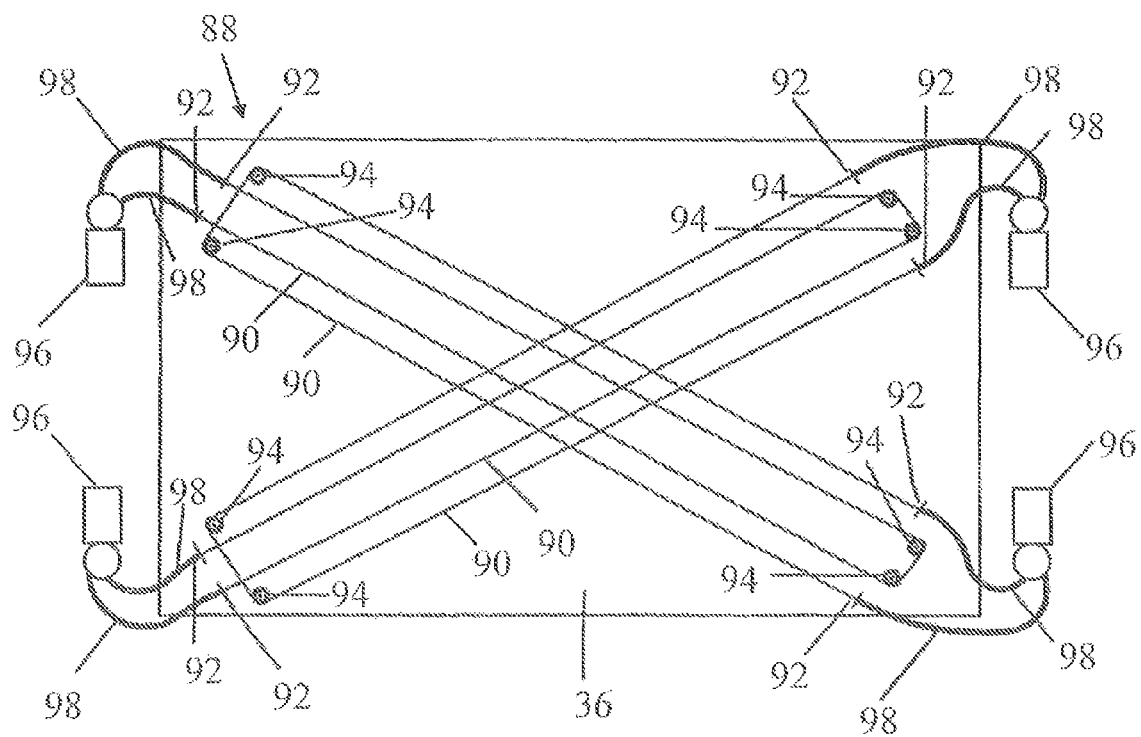
FIG. 13 is a top plan view of the sunshade apparatus of FIG. 1, with interior portions of an extension mechanism thereof shown in phantom outline.

Also provided in this embodiment is a motor driven extension mechanism for driving each of the panels between its respective extended and retracted positions, this mechanism being illustrated in FIG. 13 and designated by general reference numeral 88. The extension mechanism comprises, for each panel 70, 72, 74, 76, a cable loop 90; a pair of brackets 92; a pair of pulleys 94; and an electric cable driving mechanism 96. The electric cable driving mechanism 96 has cable sheaths 98 extending from its opposite sides and through which the cable loop 90 extends, and is adapted to draw the loop 90 therethrough in both forward and rearward directions. The sheath 98 ends are secured to the brackets 92, which in turn are secured to their respective plate. The pulleys 94 are rotatably mounted to the same respective plate, diagonally opposite the brackets 92, such that the unsheathed portion of the cable loop 90 extends from one of the sheaths 98, around the pulleys 94, and back to the other of the sheaths 98, whereby a length of cable is orientated parallel to the path of said each panel 70, 72, 74, 76. Since each of the extendable panels 70, 72, 74, 76 is attached to the cable loop 90 at point A, each panel moves along its rails (which are parallel to the legs of loop 90) to the maximum extension limit of the panel due to position of the restraining spacer 46. This movement takes place with the help of captive rails overhead attached to the underside of the respective adjacent plate 36, 40, 42, 44 plate and corresponding guiding rails on the respective extendable panel 70, 72, 74, 76 (FIGS. 8, 9 and 10). When the actuating motor 96 is driven in the opposite direction, the wire loop 90 moves in reverse direction to A whereby the respective panel 70, 72, 74, 76 is retracted. When all panels are extended, the area of sunshades provides uniform shade for the entire passenger compartment of the vehicle as shown at FIGS. 11 and 12.

Figure 14:
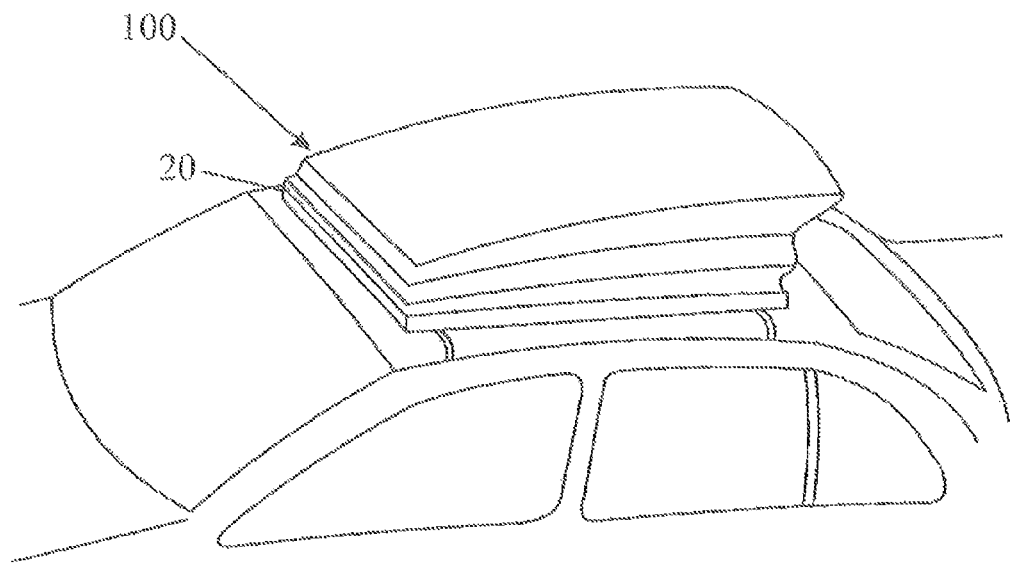
FIG. 14 is a view similar to FIG. 1, showing an embodiment in which the sunshade apparatus is combined with a luggage carrier.

A second embodiment of the present sunshade apparatus is illustrated in FIG. 14. In this embodiment, the apparatus 20 is substantially identical to that described hereinbefore, but for the fact that the apparatus 20 forms a base or lower portion of a luggage carrier 100. As the construction of luggage carriers for a car roof top is a matter of routine, further description of this embodiment is not necessary, and is not provided.

Figure 15:
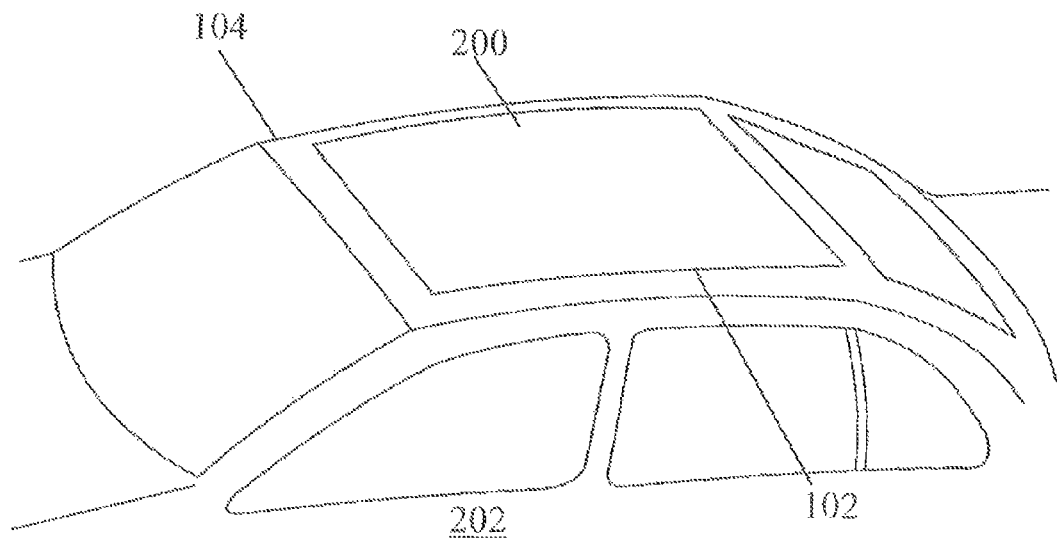
FIG. 15 is a view similar to FIG. 1, showing a vehicle roof and sunshade apparatus constructed according to yet another embodiment of the disclosure, and wherein the sunshade apparatus portion is at a lowered position thereof.
Figure 16:
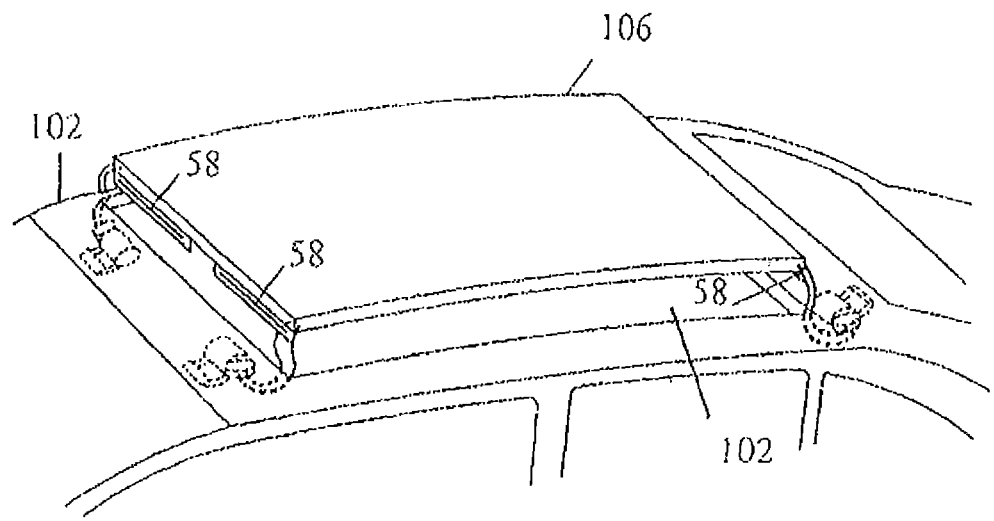
FIG. 16 is a view similar to FIG. 15, with the sunshade apparatus at a raised position thereof, this view omitting most of the mechanism for raising/lowering the sunshade apparatus for sake of clarity, the latter mechanism being shown in FIGS. 17 and 18.
Figure 17:
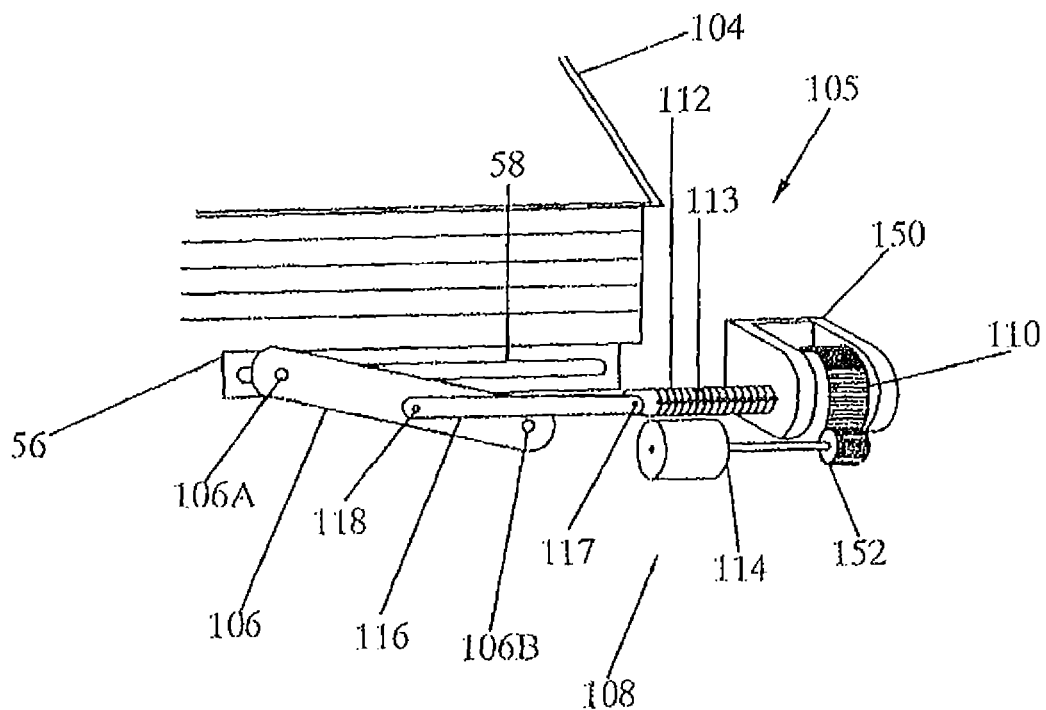
FIG. 17 is a perspective view of an exemplary form of lifter positioned at a corner of the housing of FIG. 16.
Figure 18:
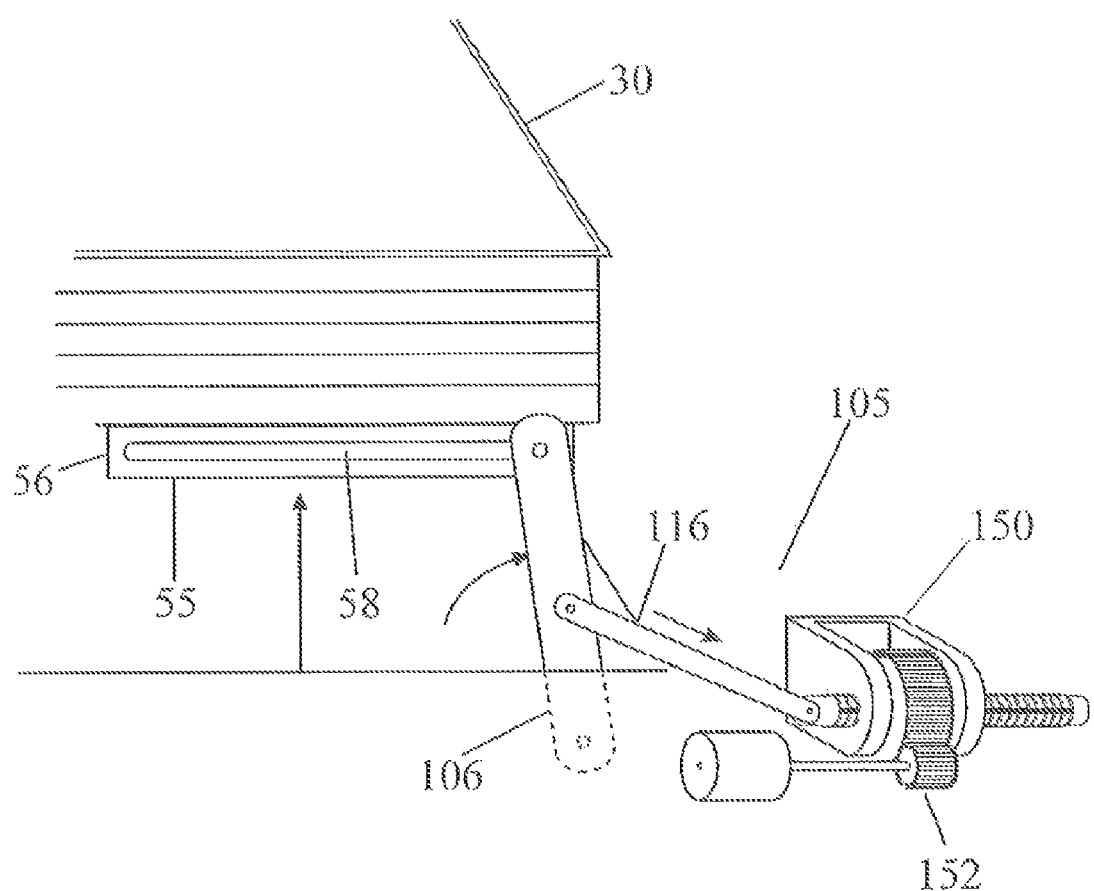
FIG. 18 is a view similar to FIG. 17 but with one corner of the sunshade apparatus and its housing shown in the raised position.

With general reference to FIGS. 15-18, a third embodiment of the present sunshade apparatus is illustrated. Herein again, the apparatus 200 can be constructed in a manner similar to the apparatus 20 except for the differences described hereinafter. The apparatus 20 was strapped in use to the vehicle roof 34, but the apparatus 200 forms part of or is incorporated into an automobile roof 104. The apparatus uses a recess 102 defined in said roof 104. The apparatus 200 includes a lifter 105, as shown in FIGS. 17 and 18, at each corner of said housing 30, and the four lifters 105 collectively define an elevation mechanism. The elevation mechanism is for moving the housing 30 and its panels between a lowered position in said recess 102 as shown in FIG. 15 and an elevated position above the roof as shown in FIG. 16. In an exemplary embodiment, the housing 30 and its panels can be lifted between six and eight inches to the elevated position. In the elevated position, the panels 70,72,74,76 of the apparatus 200 are movable to their respective extended positions to define a substantially contiguous sunshade for the vehicle 202 in the same manner as previously described.

Each lifter 105 is defined by arm support 106, a motorized drive mechanism 108 and a bracket member, the bracket member in this embodiment being defined by a downwardly extending side 55 of a respective angle 56 secured to the bottom plate 38 of the housing 30. The bottom plate 38 of this embodiment can either have two elongate sheet metal angles 56 extending along opposite side edges of the plate and connected thereto by spot welding the horizontal leg of each angle member to an edge section of the plate 38 or there can be two shorter angles 56 mounted on each of the opposite side edges as indicated in FIGS. 17 and 18. In the latter construction, each shorter angle 56 is located adjacent a respective one of the four corners of the plate 38. Elongated slots 58 in the sections 55 are orientated substantially horizontally when the automobile is disposed on a horizontal surface. Each arm support 106 has one end defining a pivot pin connector 106A slidably engaging its slot 58 and secured therein and further having an opposite end 106B pivotally connected to said vehicle roof 104. The motorized drive mechanism includes: an interiorly-threaded gear 110 rotatably mounted to the vehicle roof 104 by a bracket 150, a threaded rod 112 threadingly received by the gear 110 and pivotally coupled at 118 by a linkage 116 to the arm support 106 of the lifter 105; and a motor 114 drivingly coupled to the gear 110 for rotation thereof. The end of the rod 112 is pivotally connected at point 117 to the linkage 116. Upon actuation, the motor 114 rotates the gear 110 by means of smaller gear 152. Because the gear 110 cannot move laterally in the bracket 150, it causes axial movement of the rod 112 and consequent pivotal movement of the support arm 106, thereby raising or lowering said housing at that corner relative to the vehicle roof, depending upon the direction of motor 114 rotation. Note that the rod 112 is prevented from rotating by a groove 113 that runs along the length of the rod, this groove receiving a tongue or tab (not shown) formed in a side of the bracket 150.

Figure 19:
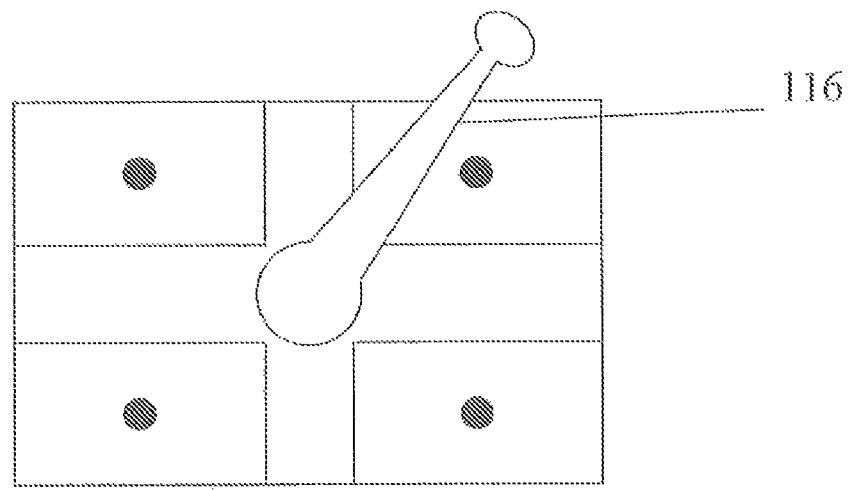
FIG. 19 is a view of a joystick that can be used to tilt the sunshade housing towards one of the four sides of the vehicle where the sun may be located in order to maximize protection.
Figure 20:
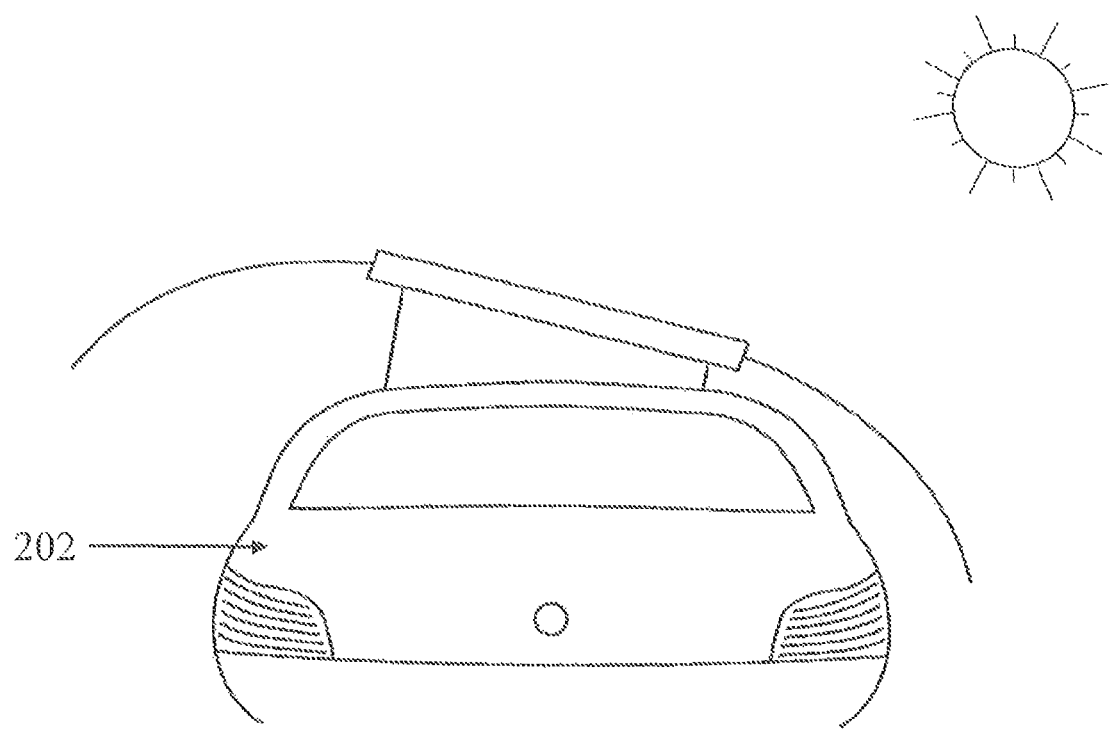
FIG. 20 is a rear view of the structure of FIG. 16, with the panels disposed at their extended positions and the housing tilted towards the right.

In this embodiment, a remote control (not shown) is provided. After the driver and passengers exit the vehicle 104, the driver gives a command, whereupon the lifters 105 elevate the housing 30 about 6-8 inches above the roof 34 and thereafter the extension mechanism deploys the panels to their extended positions. A joystick 116, which is part of the remote control and is shown in FIG. 19 permits the operator to lower the corners of the housing 30 orientated towards the sun, as shown in FIG. 20, to provide maximum shielding. For example, the joystick control can be set up so that movement of the joystick in the direction of the sun causes the sunshade apparatus to be tilted down in the same direction. When the vehicle 202 is to be put in motion again, the driver gives a command, whereby the panels 70,72,74,76 are automatically returned to the retracted positions, and thereafter, the lifters 105 lower the housing 30 into the recess 102. The manner in which such a joystick remote and its control system can be constructed is routine to a person of ordinary skill in the art and as such is neither described herein nor necessary.

Figure 21:
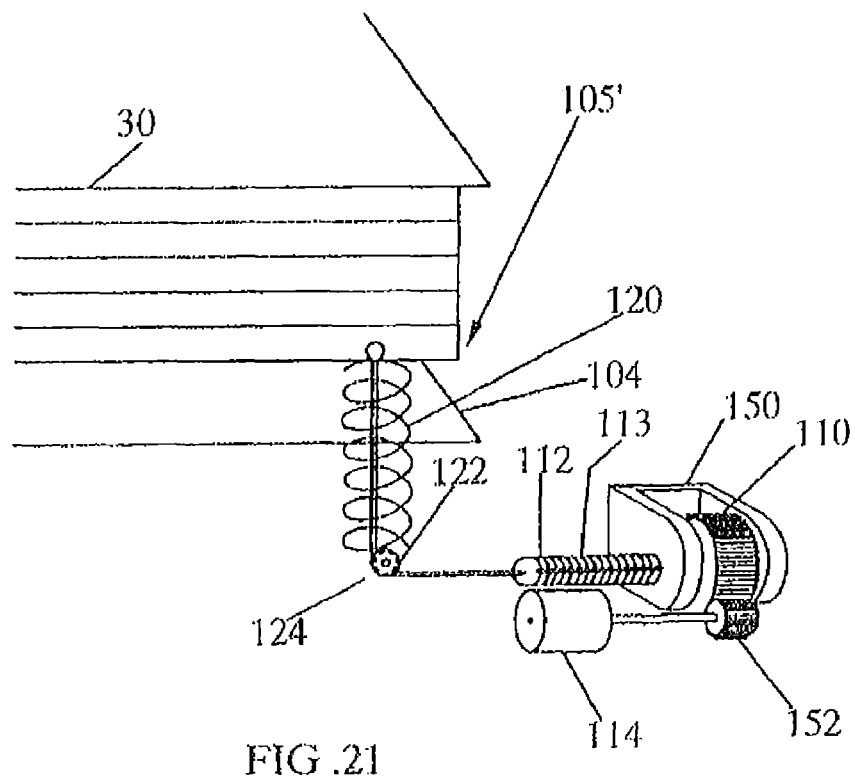
FIG. 21 is a view similar to FIG. 18, showing an alternate lifter and one corner of the sunshade housing in the raised position.
Figure 22:
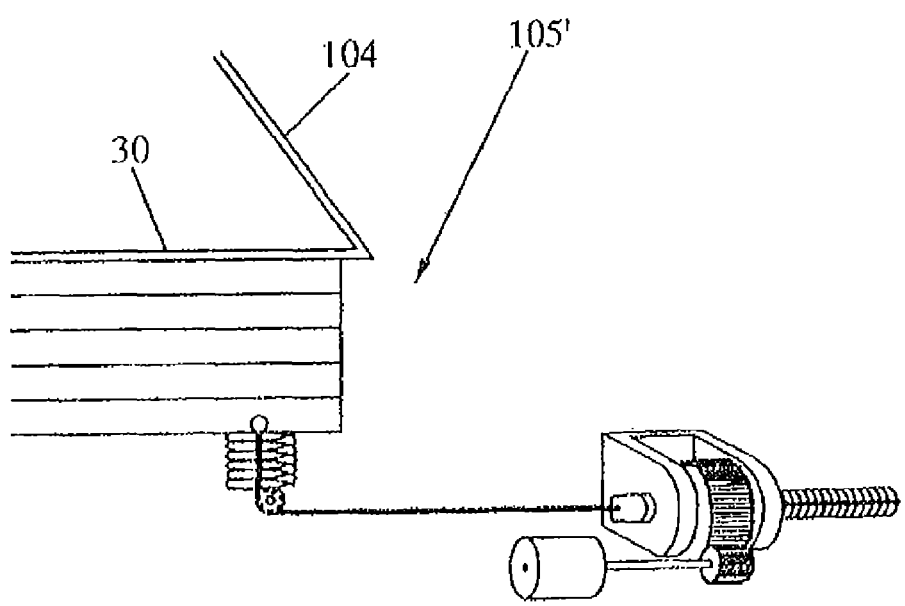
FIG. 22 is a view similar to FIG. 17, showing the alternate lifter of FIG. 21 with the corner of the sunshade housing in the lowered position.
Figure 23:
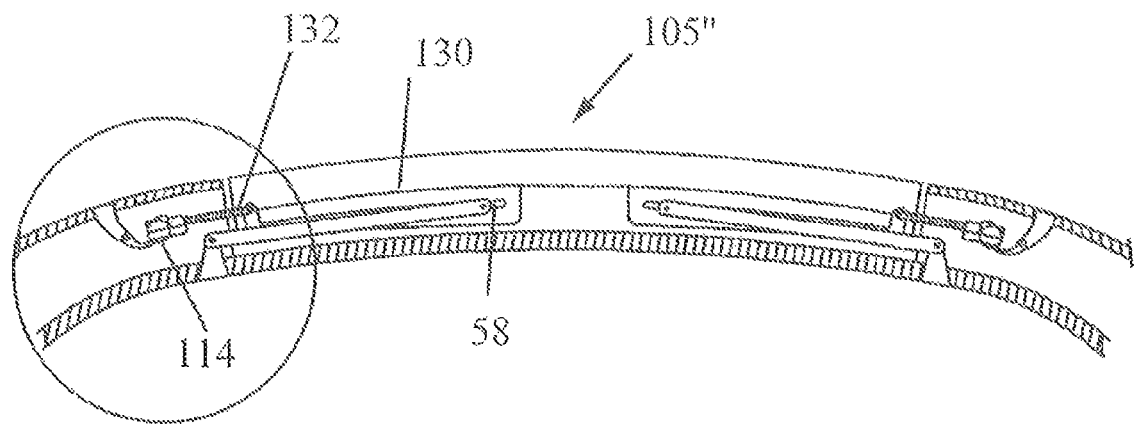
FIG. 23 is a partial rear view of another vehicle roof with further alternative lifters shown in phantom outline.
Figure 24:
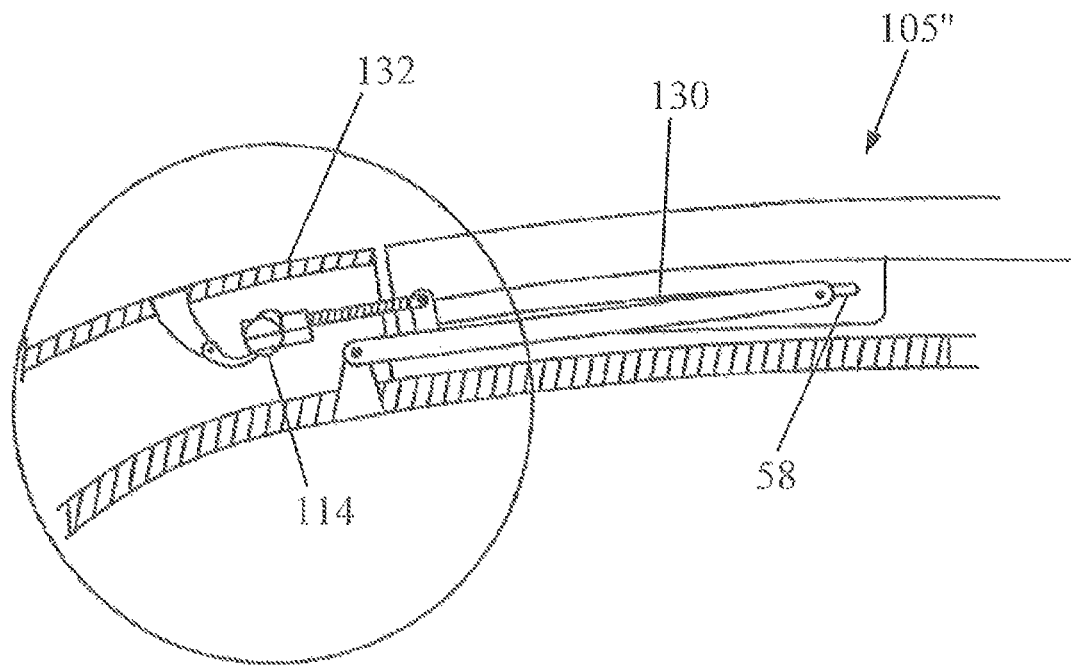
FIG. 24 is an enlarged view of encircled area 24 of FIG. 23.
Figure 25:
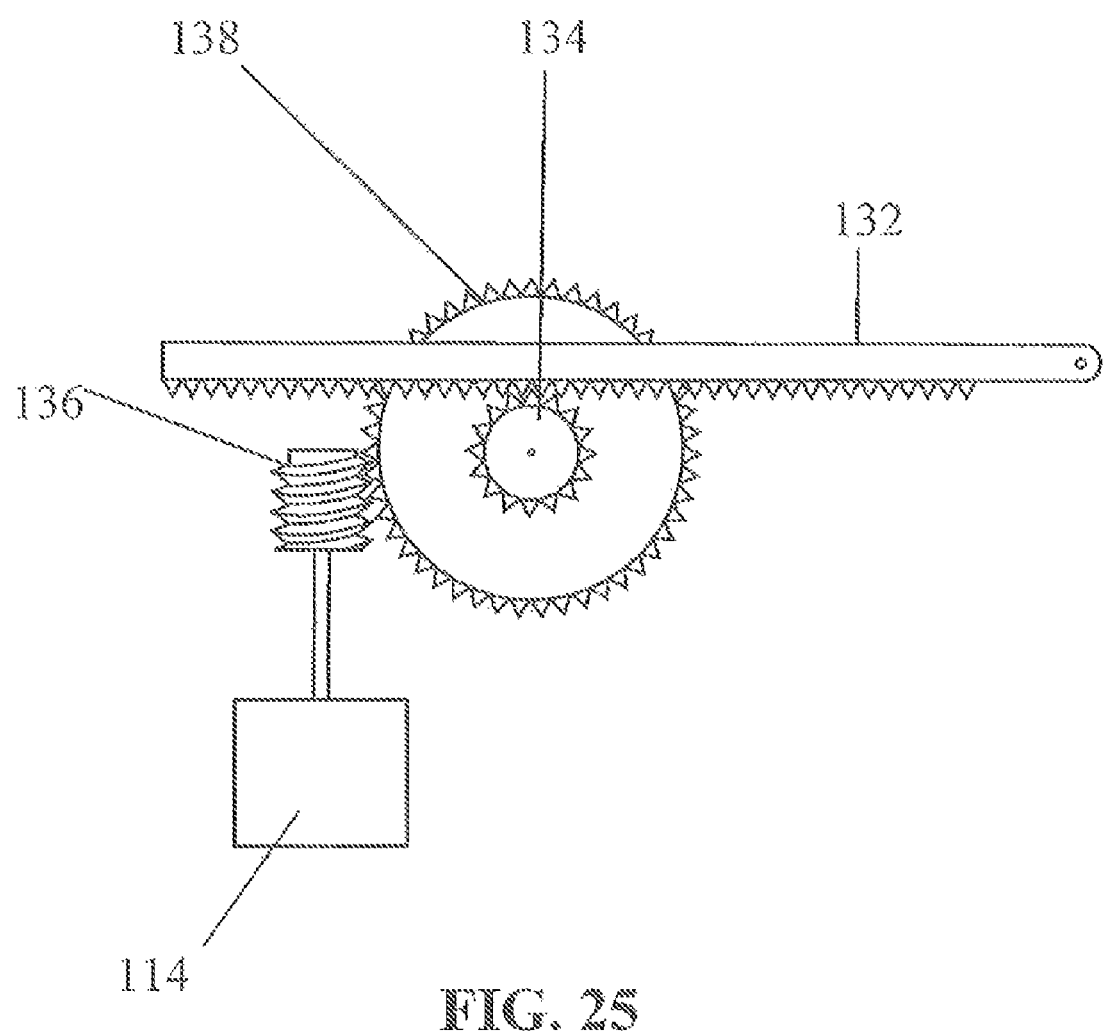
FIG. 25 is a detail perspective view of a reduction gear portion of the structure of FIG. 24, with interior components shown in phantom outline, for clarity.
Figure 26:
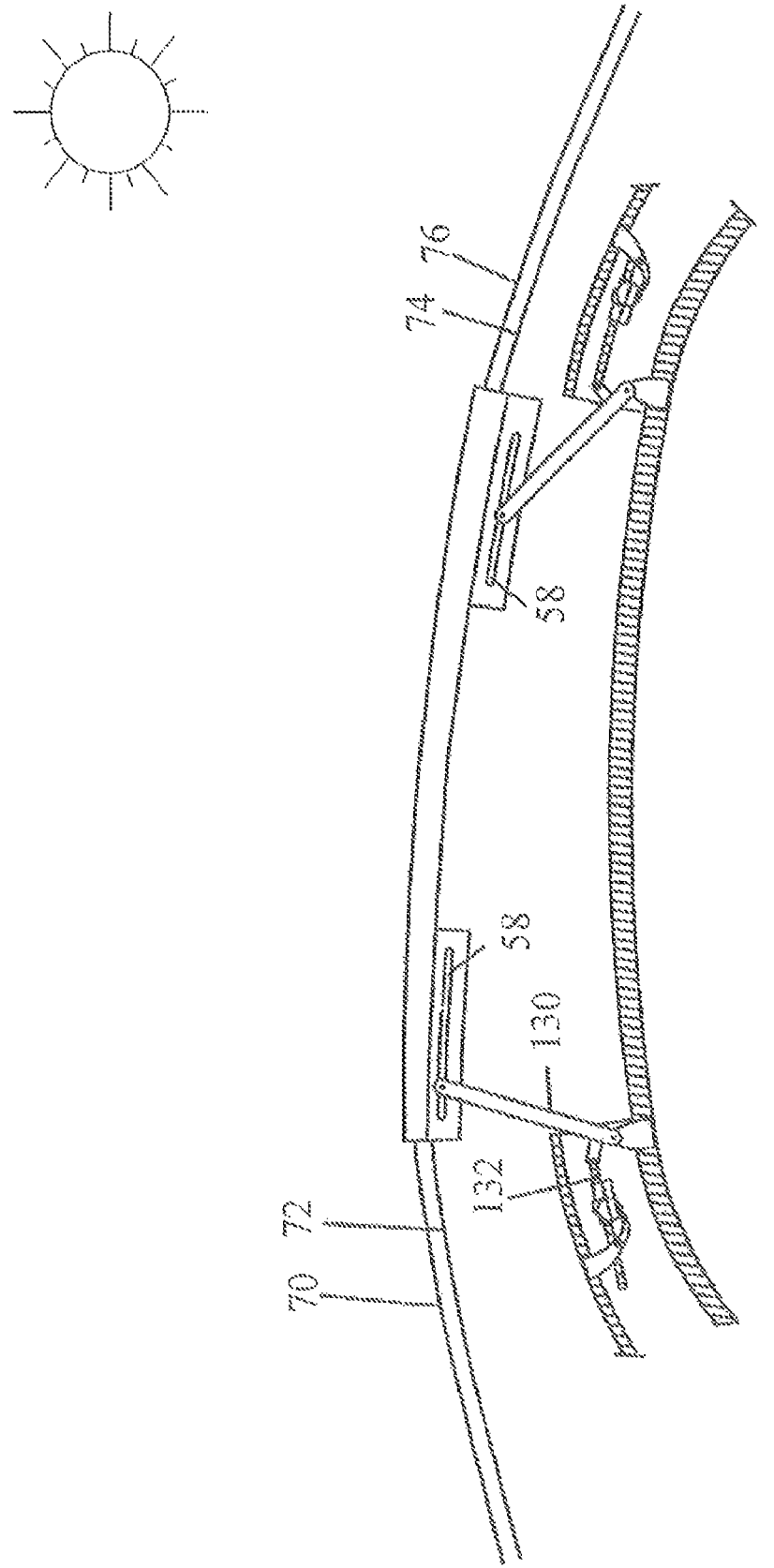
FIG. 26 is a view similar to FIG. 23, with the housing elevated and tilted to the right, and the panels at their extended positions.

FIGS. 21 and 22 show a lifter 105' schematically with the housing 30 in raised and lowered positions, respectively. The lifter 105' comprises a spring 120, pulley 122, motor 114, reduction gear 110/152, bracket 150, threaded rod 112, and cable 124 arrangement, the housing is supported by the spring 120, so as to bias the housing 30 for movement to the raised position. Flexible cable 124 is attached at one end to the housing 30 and at the other to rod 112 through pulley 122. The motorized drive mechanism includes an internally threaded gear 110 rotatably mounted on bracket 150 attached to the vehicle roof, the threaded rod 112 threadingly received by gear 110 and coupled to cable 124 and a motor 114 drivingly coupled to gear 110 for rotation thereof. Upon activation, the motor 114 rotates the gear 110 by means of smaller gear 152. Because the gear cannot move laterally in the bracket 150, its rotation causes axial movement of rod 112 and consequent movement of cable 124 thereby raising or lowering the housing 30 at that corner relative to the vehicle roof, depending upon the direction of rotation of the motor 114. Note that the rod 112 is prevented from rotating by groove 113 that runs along the length of the rod, this groove receiving a tongue or tab (not shown) formed in the side of the bracket 150. FIG. 21 shows the housing 30 in the raised and FIG. 22 in the lowered position. Since there are four lifters at four corners at four corners of the housing, when they operate in unison, the housing 30 is raised or lowered as a whole.

A yet further alternate lifter 105" is shown in FIGS. 23-26 in use with a vehicle similar to that of FIG. 15. This lifter 105" includes an arm 130 substantially identical in function to support arm 106 of lifter 105 and a rack 132 which acts on said arm 130 in a manner similar to the manner in which threaded rod 112 of lifter 105 acts on arm 106. However, whereas rod 112 moves axially due to engagement with gear 110, in this lifter 105", rack 132 moves axially under engagement with a pinion 134 which is coupled for co-rotation which a larger diameter gear 138 driven by a worm 136 coupled to motor 114. It is noted that above-described angles 56 (see FIGS. 17 and 18) are disposed on the front and rear edges of the bottom plate, and the slots 58 are provided in these angles at the front and rear of the bottom plate 38.

Those skilled in this sunshade art will appreciate that it is also possible to construct a sunshade apparatus according to the present disclosure for providing shade for a passenger compartment of a vehicle with fewer than four panels, particularly in the case of an apparatus intended for use on a vehicle having fewer windows subject to sun exposure or to less sun exposure, for example, a truck such as a pick-up truck. In some cases, it may be desired to simply provide a sunshade for the large front window of the vehicle, in which case the present apparatus can be constructed with only two panels, or even one movable panel, that cover(s) the front window when extended forwardly.

While but several embodiments of the present invention have been herein shown and described, along with three embodiments of a lifter which can be used therein, it will be understood that various changes in size and shape of parts may be made without departing from the spirit or scope of the invention. Accordingly, the invention should be understood as limited only by the claims appended hereto, purposely construed.

The invention claimed is:

1. A sunshade apparatus for use with a vehicle having a roof and windows including front and side windows, said apparatus comprising:
    a sunshade housing adapted for mounting in or on said roof and having a top, a bottom and a horizontally extending perimeter when the apparatus is installed in or on said roof;
    four panels mounted to and supported by said housing with each panel being movable between a respective retracted position, where the panels are disposed on top of one another in stacked relation, and a respective extended position where each panel extends outwardly from a side of the housing and where the four panels together form a substantially continuous shade surface extending about said perimeter of said housing and are capable of providing shade for said windows of the vehicle including said front and side windows; and
    a panel guide mechanism for each of said panels connected to its respective panel and the housing, said guide mechanism constraining its respective panel for movement along a substantially linear path between the panel's extended and retracted positions;

wherein said shade surface includes corner shade areas located at and extending outwardly both longitudinally and transversely from corners of said roof during use of said sunshade apparatus and wherein, relative to a front and a rear of said vehicle, and when said panels are in their extended positions and are in use, a first of said panels extends towards the front and a right side of the vehicle, a second of said panels extends towards the right and a left side of the vehicle, a third of said panels extends towards the rear and the right side of the vehicle, and a fourth of said panels extends towards the rear and the left side of the vehicle.

2. A sunshade apparatus according to claim 1 wherein when said panels are in their retracted positions, the panels are disposed within said housing between said top and said bottom of the housing.

3. A sunshade apparatus according to claim 2 wherein each panel guide mechanism includes an elongate guide arrangement mounted on said housing so as to be disposed in spaced, stacked relation to one another and a slide mechanism mounted on its respective panel and slidably engaging its guide arrangement for translational movement therealong, said movement corresponding to movement of the respective panel between its retracted and extended positions.

4. A sunshade apparatus according to claim 3 including a motor driven extension mechanism for moving each panel along its path between its retracted and extended positions.

5. A sunshade apparatus according to claim 4 wherein each extension mechanism includes a cable loop connected to its respective panel and having a section of the loop extending parallel to said path of the respective panel, said cable loop being movable to drive the panel along its path.

6. A sunshade apparatus according to claim 2 wherein said four panels are substantially rectangular and are substantially coextensive with the housing when the four panels are in their retracted positions and the apparatus is viewed from above.

7. A sunshade apparatus as defined in claim 1 further including straps for mounting said housing to the roof of a vehicle.

8. A sunshade apparatus as defined in claim 1 further including a luggage carrier, wherein said top of said housing provides a base for and supports said luggage carrier.

9. A sunshade apparatus for use with a vehicle having a roof and windows including windows including front and side windows, said apparatus comprising:
a sunshade housing adapted for mounting in or on said roof and having a top, a bottom and a horizontally extending perimeter when the apparatus is installed in or on said roof;
four panels mounted to and supported by said housing with each panel being movable between a respective retracted position, where the panels are disposed on top of one another in stacked relation, and a respective extended position where each panel extends outwardly from a side of the housing and where the four panels together form a substantially continuous shade surface extending about said perimeter of said housing and are capable of providing shade for said windows of the vehicle including front and side windows; and
a panel guide mechanism for each of said panels connected to its respective panel and the housing, said guide mechanism constraining its respective panel for movement along a substantially linear path between the panel's extended and retracted positions;
wherein said shade surface includes corner shade areas located at and extending outwardly both longitudinally and transversely from corners of said roof during use of said sunshade apparatus use of said sunshade apparatus and wherein said apparatus is adapted for mounting in a recess formed in said roof and includes an elevation mechanism for moving said housing and the panels between a lowered position in said recess and an elevated position above the roof.

10. A combination of a vehicle roof structure and a sunshade apparatus for shading a passenger compartment including windows of a vehicle from the sun, said combination comprising:
a vehicle roof having a recess formed therein, said recess having an open top;
a sunshade housing adapted for mounting in said recess;
an elevation mechanism for moving the housing between a lowered position in said recess and an elevated position wherein at least a major portion of said housing is above a surrounding region of the vehicle roof;
at least one panel mounted to and supported by said housing with each of said at least one panel being slidable between a respective retracted position, where the panel is disposed substantially in or on said housing, and a respective extended position, where the panel extends outwardly from a side of the housing so as to be capable of shading one or more of said windows during use of the sunshade apparatus; and
a panel guide mechanism for each said at least one panel connected to the panel and the housing, said guide mechanism constraining its panel for movement along a substantially linear path between its extended and retracted positions.

11. A combination according to claim 10 wherein there are four of said at least one panel mounted to and supported by said housing, said panels are substantially rectangular, and in their retracted positions, said panels are arranged in said housing one above another in a stacked relationship and are separated from one another.

12. A combination according to claim 11 wherein in their extended positions, the four panels form a substantially continuous shade surface extending about a horizontally extending perimeter of said housing.

13. A combination according to claim 11 including a motor driven extension mechanism for moving each panel along its respective path between the retracted and extended positions.

14. A combination according to claim 13 wherein each extension mechanism includes a cable loop connected to its respective panel and having a section of the loop extending parallel to said path of the respective panel, said cable loop being movable to drive the panel along its path.

15. A sunshade apparatus for use with a vehicle having a roof and windows including front and side windows, said apparatus comprising:
a sunshade housing adapted for mounting in or on said roof and having a top, a bottom, a front end adapted to face a front of the vehicle, a rear end adapted to face a rear of the vehicle, two opposite sides extending between said front and rear ends and a longitudinal centreline extending between said front and rear ends of the housing;
four substantially rectangular panels mounted in and supported by said housing with each panel being movable between a respective retracted position, where the panels are disposed one above another in said housing, and a respective extended position where two of said panels project outwardly from said front end of the housing and also outwardly and respectively from said opposite sides and the remaining two panels project outwardly from said rear end of the housing and also outwardly and respectively from said opposite sides of the housing;

a panel guide mechanism for each of said panels connected to its respective panel and the housing, said guide mechanism constraining its respective panel for movement along a substantially linear path extending at an acute angle to said centreline and between the panel's extended and retracted positions.

16. A sunshade apparatus according to claim 15 including a motor driven extension mechanism for moving each panel along its path between its respective retracted and extended positions.

17. A sunshade apparatus according to claim 16 wherein said apparatus is adapted for mounting in a recess formed in said roof and includes an elevation mechanism for moving said housing and the panels between a lowered position in said recess and an elevated position above the roof.

18. A sunshade apparatus according to claim 16 wherein each panel guide mechanism includes an elongate guide arrangement mounted on said housing so as to be disposed in spaced, stacked relation to one another and a slide mechanism mounted on its respective panel and slidably engaging its guide arrangement for translational movement therealong, said movement corresponding to movement of the respective panel between its retracted and extended positions.

19. A sunshade apparatus according to claim 16 wherein each extension mechanism includes a cable loop connected to its respective panel and having a section of the loop extending parallel to said path of the respective panel, said cable loop being movable to drive the panel along its path.

* * * * *